Figure 11:
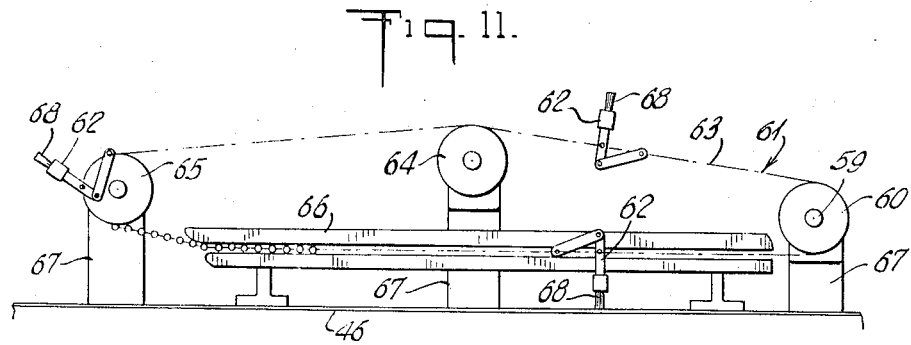

Feb. 21, 1967  A. J. GRINER  3,305,069
CRACKER CONVEYOR SYSTEM AND APPARATUS
Filed Oct. 15, 1965  8 Sheets-Sheet 1
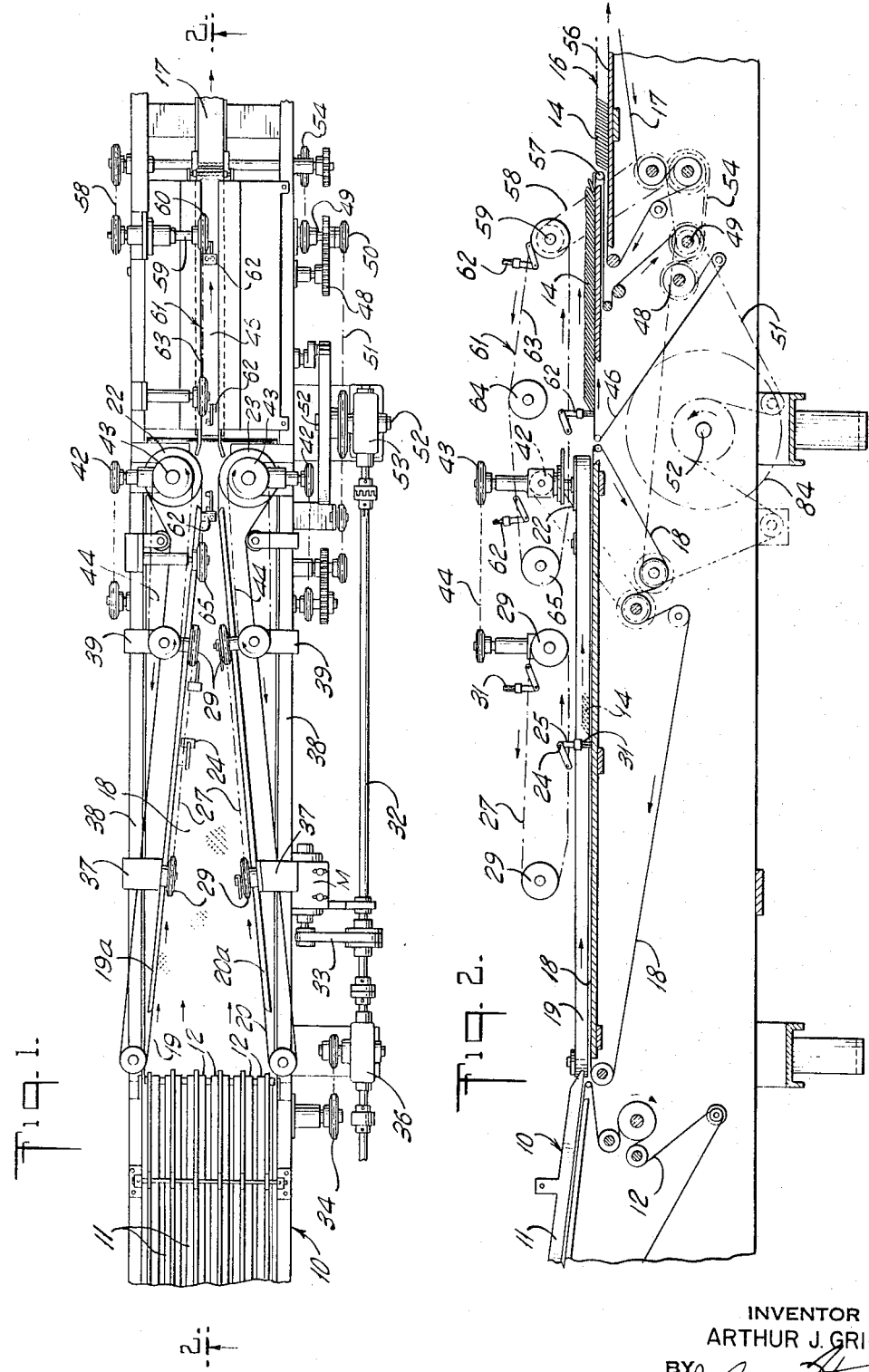
INVENTOR
ARTHUR J. GRINER
BY
PATENT AG'T.

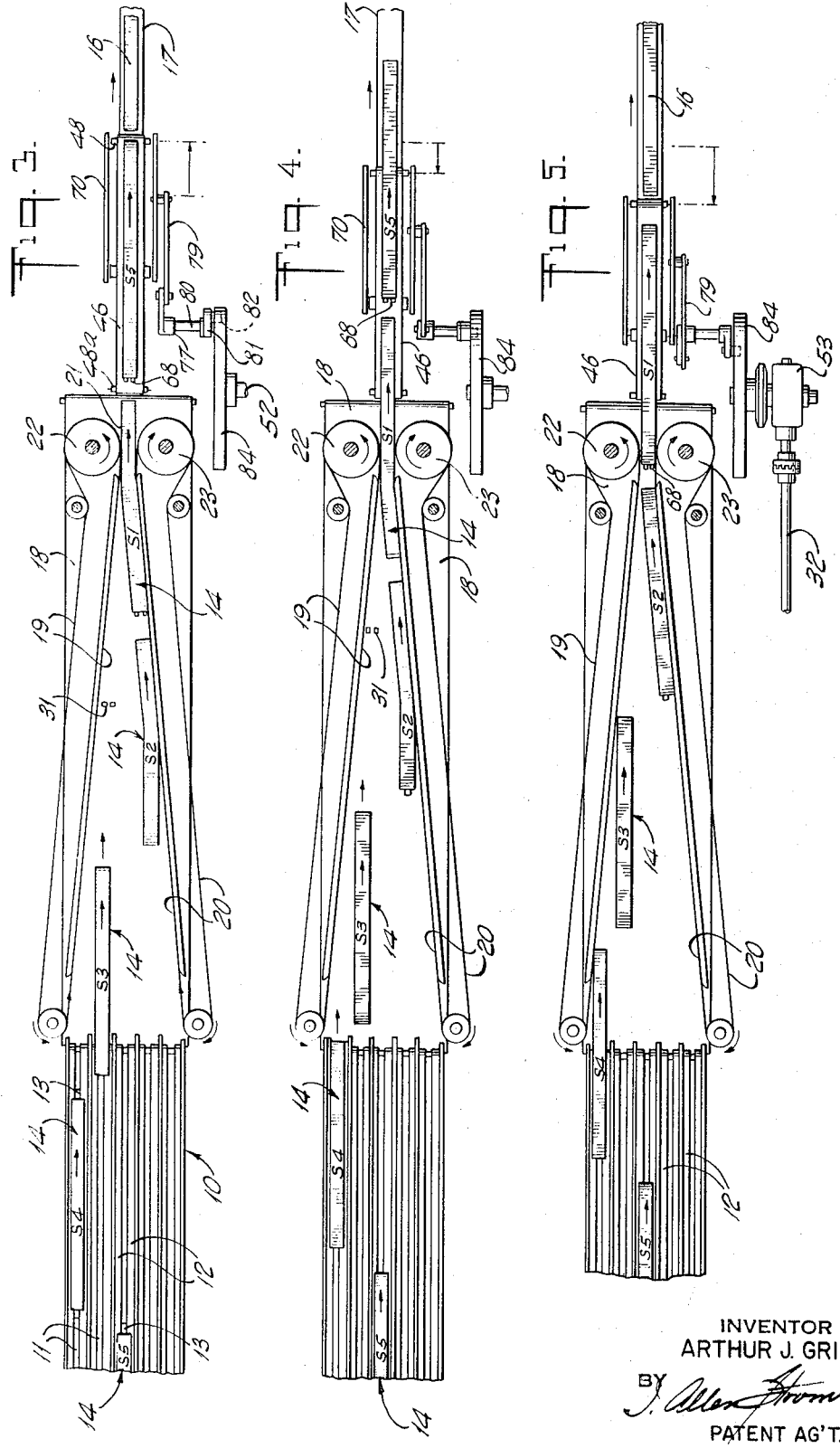

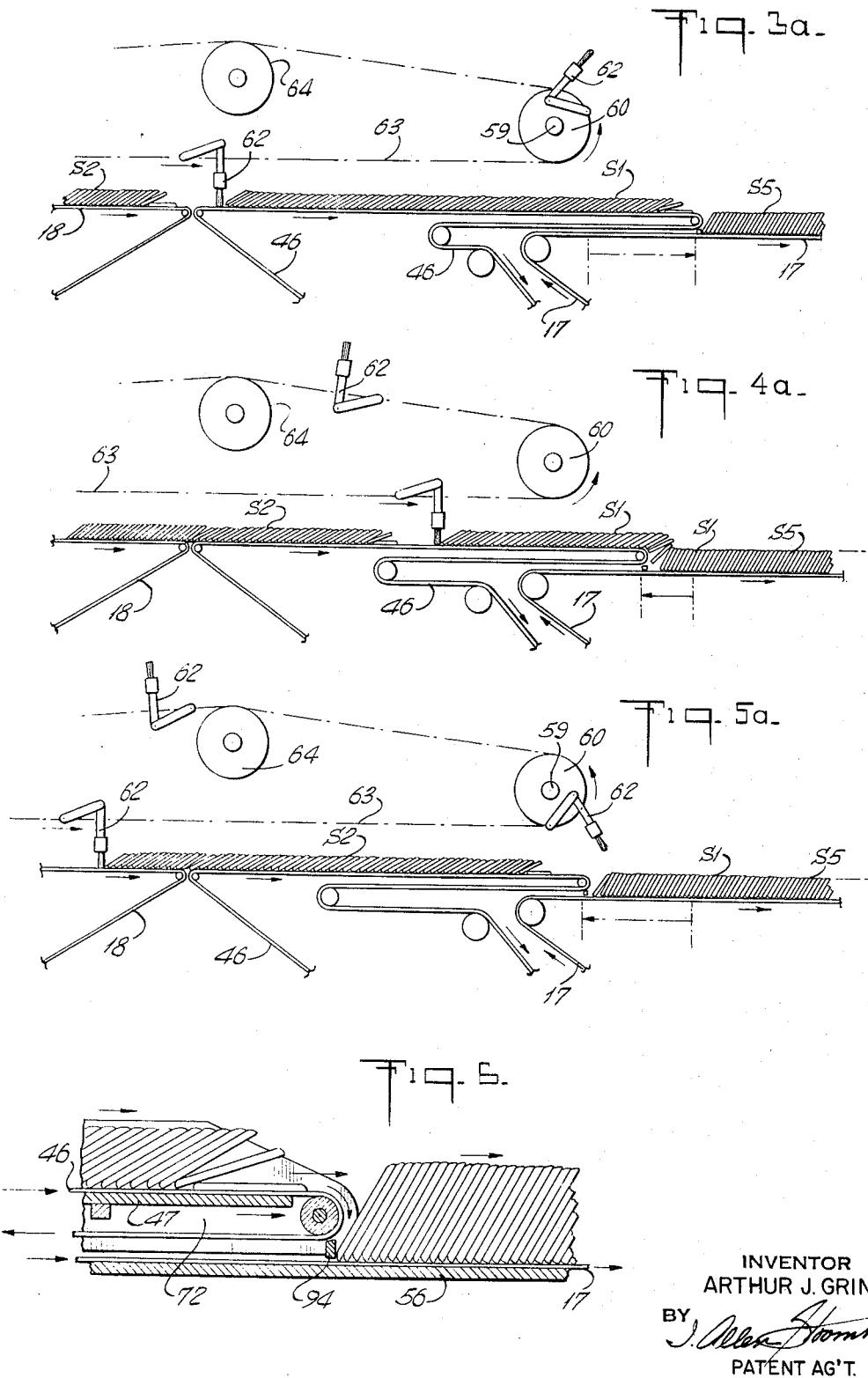

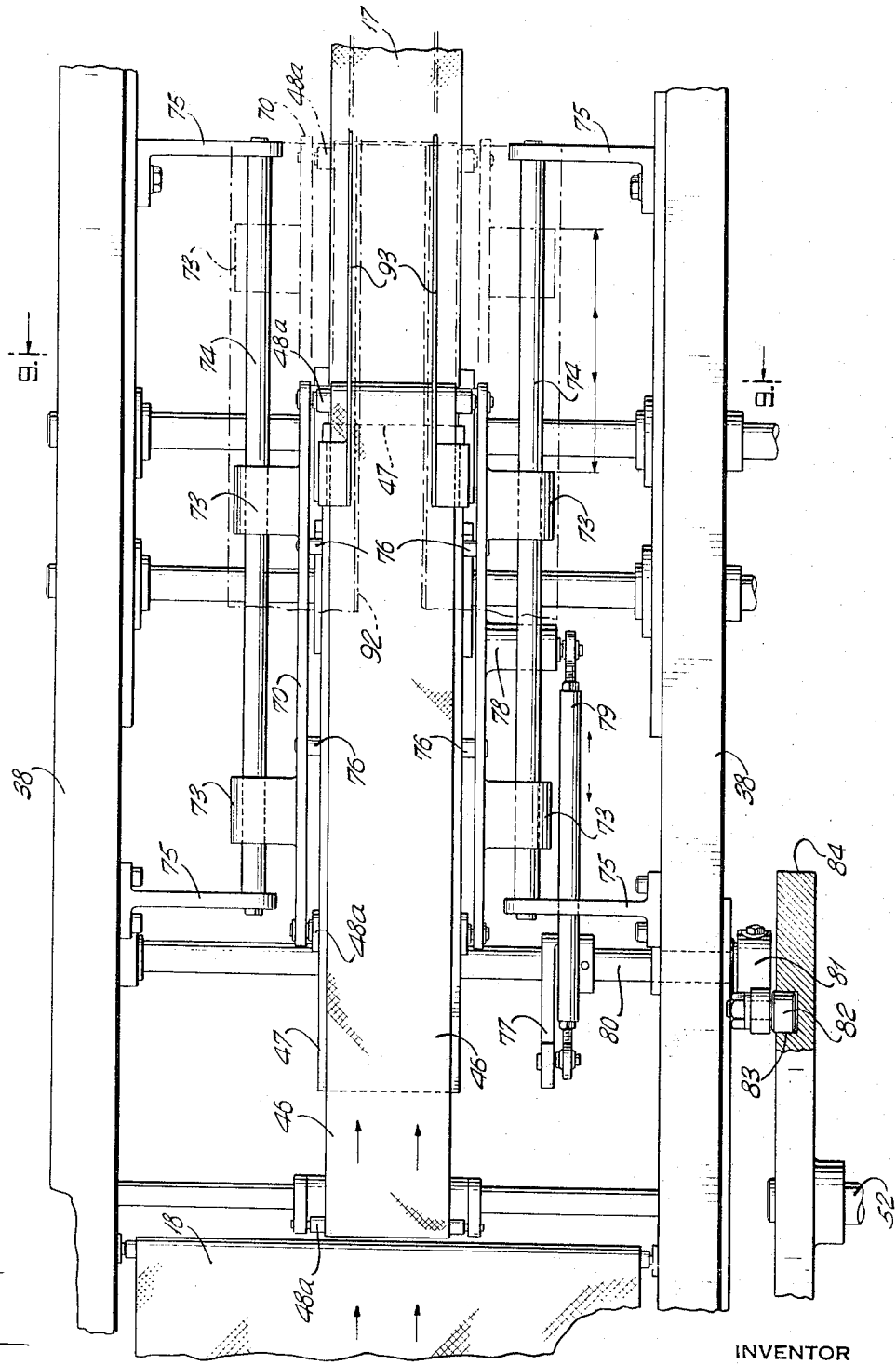

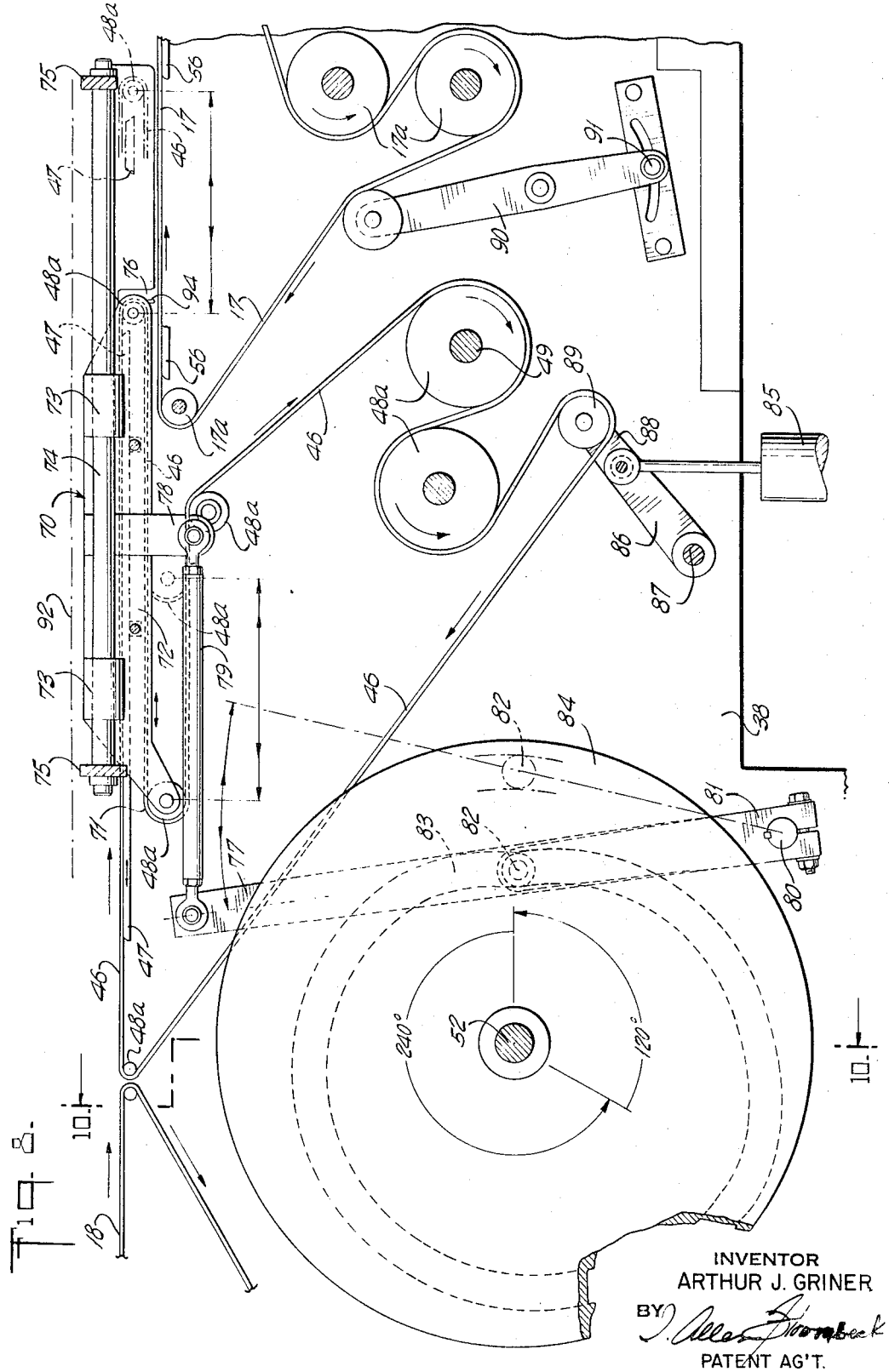

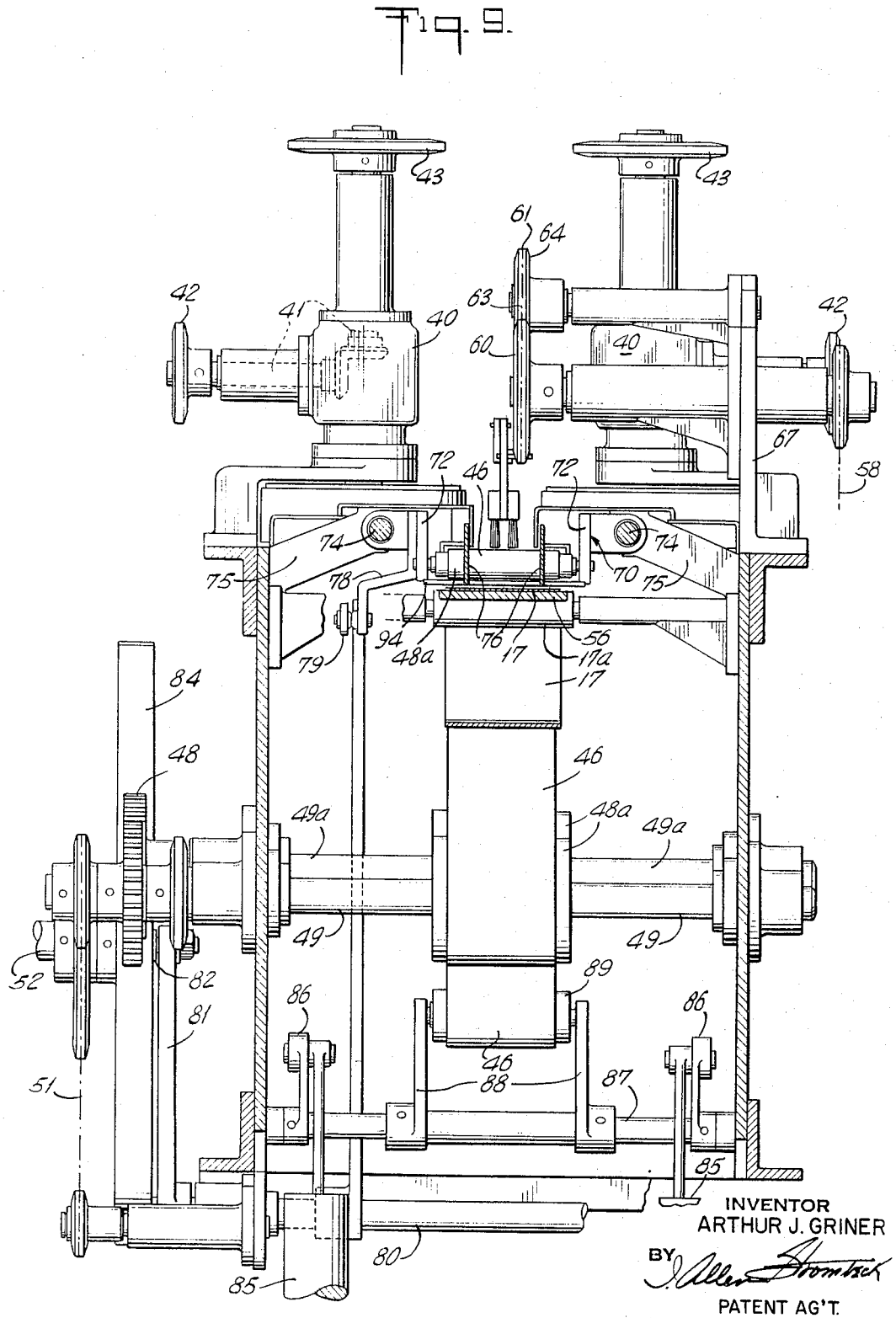

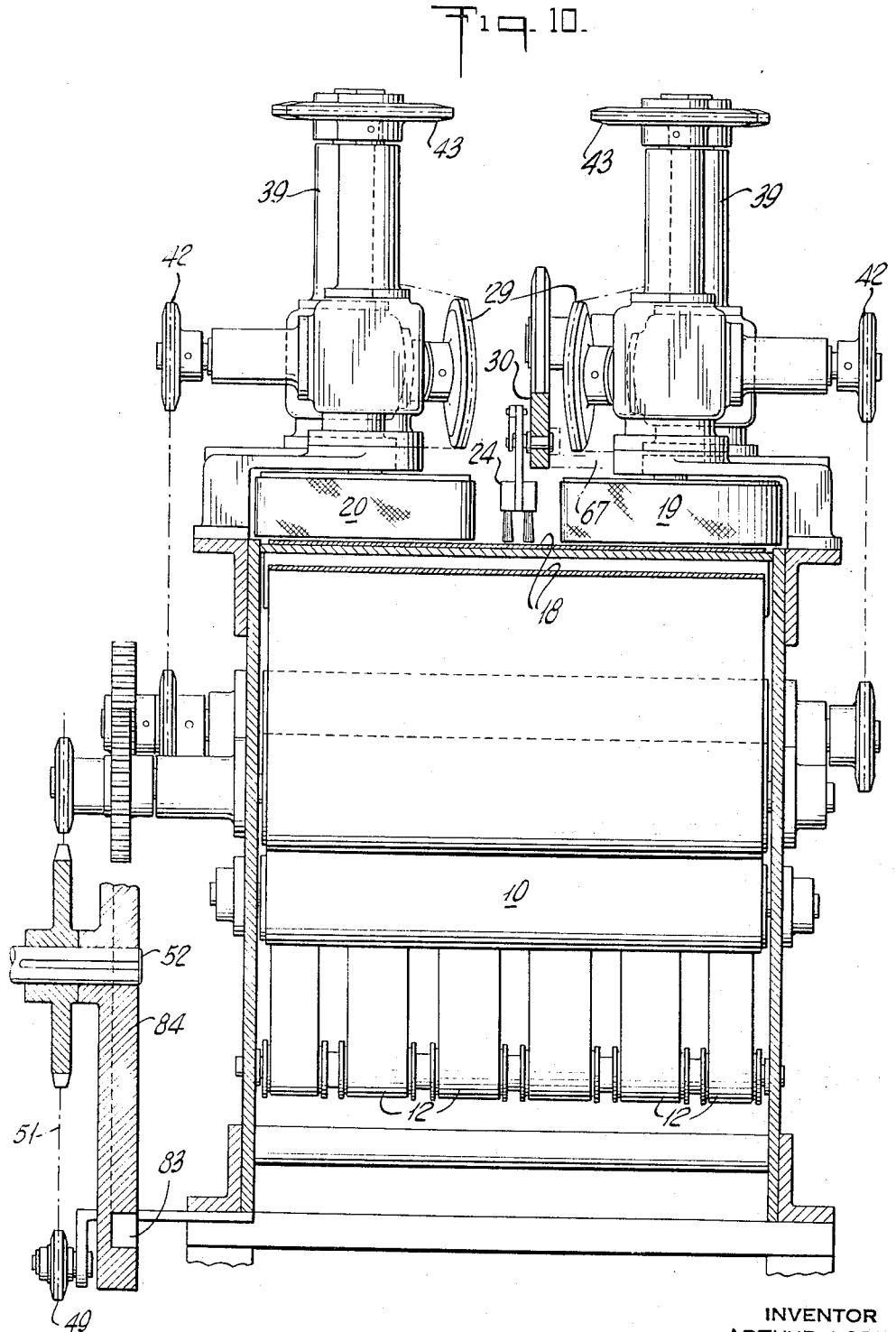

Feb. 21, 1967 A. J. GRINER 3,305,069
CRACKER CONVEYOR SYSTEM AND APPARATUS
Filed Oct. 15, 1965 8 Sheets-Sheet 8

INVENTOR
ARTHUR J. GRINER
BY
PATENT AG'T.

United States Patent Office 3,305,069
Patented Feb. 21, 1967

3,305,069
CRACKER CONVEYOR SYSTEM
AND APPARATUS
Arthur J. Griner, Wyckoff, N.J., assignor to National Biscuit Company, New York, N.Y., a corporation of New Jersey
Filed Oct. 15, 1965, Ser. No. 496,348
10 Claims. (Cl. 198—32)

This invention relates to a conveyor system and apparatus for feeding articles such as biscuits and crackers between a feed-in point and an outfeed point.

When rows of crackers are shingled and stacked after leaving an oven in very large quantities they must be conveyed rapidly, in single file to a wrapping machine which is accomplished by using plural parallel conveyors on the belts of which the columns of edgewise stacked crackers of predetermined length are advanced individually, one column ahead of an adjacent column. As these columns are advanced to a wrapping machine in spaced endwise relation to each other it has been necessary to fill in the gaps between the rows or stacks manually in order to provide for the outfeed of the crackers in a closed row or column for feeding them to a wrapping machine.

A primary object of the invention is to provide, in a conveying system a tie-in apparatus for receiving spaced parallel columns of stacked crackers from an input conveyor and funneling them, to a shuttle conveyor for assembly in a continuous line on an output conveyor.

A further object of the invention is to provide for the funneling of parallel columns of crackers by conveying them in converging paths to a funneling point from which they are fed to a shuttle conveyor for deposit on an output conveyor.

A still further object is to provide a novel form of shuttle conveyor which provides a method of stacking individual columns of crackers on an outfeed conveyor in one continuous unbroken line.

Other objects of the invention are to apply varying speeds of travel to a shuttling belt and at the same time operating the belt in a portion thereof so that a depositing effect can be obtained in feeding crackers to an output belt; to provide a novel belt shuttling mechanism that coacts with the outfeed belt in synchronized speed and movement to provide the depositing effect; and to provide means for keeping an oblique tilt of the edgewise stacked crackers at a minimum so that upstanding crackers can be fed to a metering and wrapping machine.

The nearest art available to applicant is Patent No. 3,133,386, granted May 19, 1964, to Lowell B. Johnston for Method of Conveying and Processing Bodies. This patent method has to do with the changing of speed of conveyors and intermittently advancing connectors of the conveyors to segregate articles of material in batches or groups. The patent does not show applicant's novel shuttle structure that provides the "step-off" operation essential to the assembly of a continuous row of fragile crackers to be advanced to a wrapping section.

Figure 12:
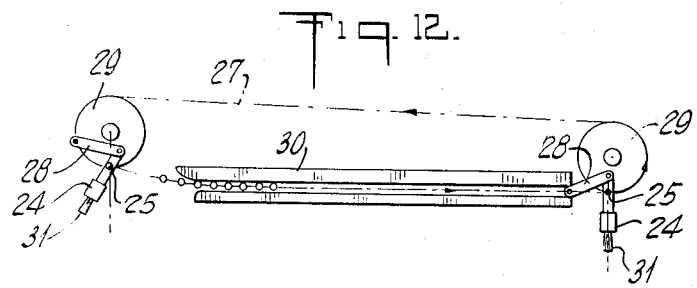
Figures 13, 14:
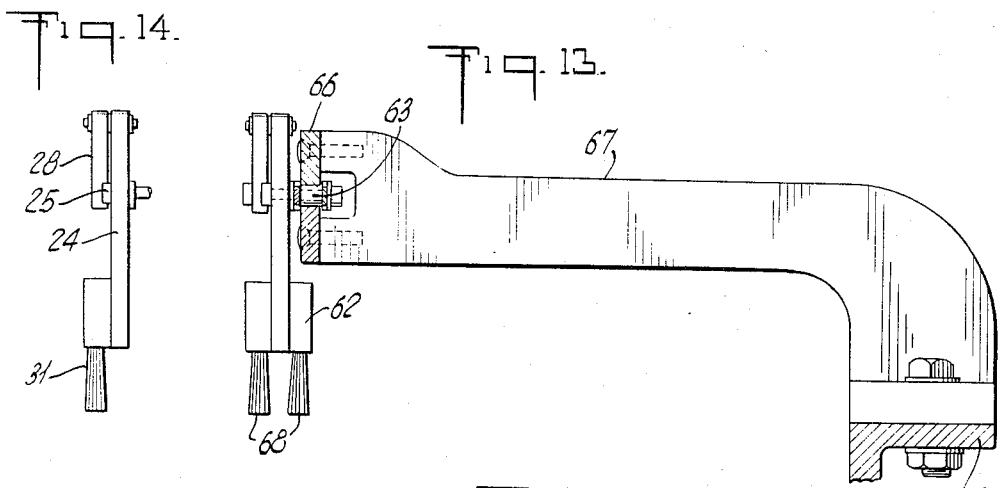
Figure 15:
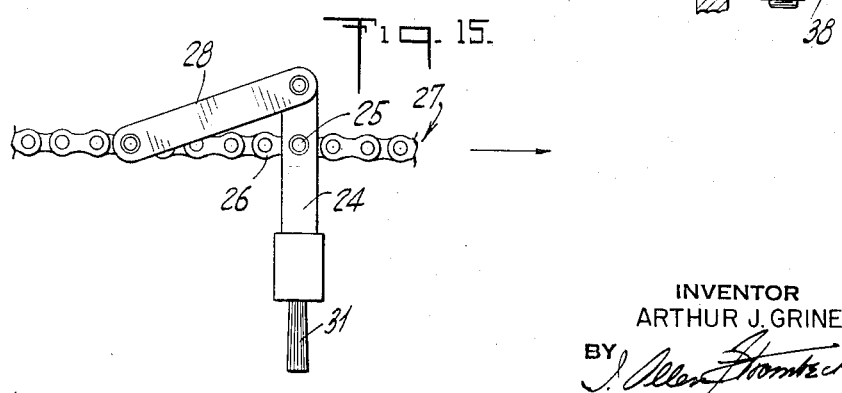

With these and other objects in view, the invention comprises certain constructions hereinafter described and then particularly pointed out in the claims and a preferred embodiment of the invention is illustrated in the accompanying drawings, in which:

FIGURE 1 is a plan view of a tie-in machine that connects an infeed means with an outfeed or cracker advancing means in a conveyor line for feeding biscuits, crackers or the like from oven to a packaging machine, FIGURE 2 is a view in sectional elevation taken on the line 2—2 of FIGURE 1 showing the relative positions of conveyors and other article feeding means, FIGURE 3 is a diagrammatic plan view of the machine unit shown in FIGURE 1, the positions of succeeding series or rows of crackers being shown, FIGURES 4 and 5 are views similar to FIGURE 3 illustrating adjacent columns of crackers being fed independently for accumulation into a single column on an outfeed or cracker advancing conveyor, FIGURES 3A, 4A and 5A are diagrammatic views in sectional elevation of the FIGURES 3, 4 and 5 and show the action of cracker propelling means operating in conjunction with the conveyors, FIGURE 6 is an enlarged fragmentary view in sectional elevation taken at the junction of a shuttle conveyor means and an outfeed or advancing conveyor means and showing the stacking operation at the discharge end of said shuttle conveyor means, FIGURE 7 is an enlarged plan view of the shuttle conveyor means, parts being shown in section to clarify the structure, FIGURE 8 is a side view of the mechanism shown in FIGURE 7 illustrating the relative arrangement of the feed belts and the shuttle propelling means, FIGURE 9 is a cross-sectional view on the line 9—9 of FIGURE 7 showing the mounting of the shuttle and conveyor associated therewith and the relative positions of the parts in the frame of the machine, FIGURE 10 is a view similar to FIGURE 9 but taken substantially on the line 10—10 of FIGURE 8 to show the guide track for one of the brush conveyors and the operating means therefor, FIGURE 11 is a diagrammatic view in side elevation showing the forward brush or pushing conveyor and the guide track therefor, which coacts with the converging and shuttle conveyor belts, FIGURE 12 is a view similar to FIGURE 11 showing one of the flight carrying pushing conveyors for initially advancing the columns of crackers along the column converging belt, FIGURE 13 is an enlarged side view, partly in section, of the chain conveyor supporting track, shown partly, in outline in FIGURE 10, FIGURE 14 is a detail end view of the brush mounting supporting a single feed brush as used on the first or initial pushing conveyor, and FIGURE 15 is a side view of a flight carrying a brush mounting and part of a supporting conveyor chain showing the link mounting of the brush for rapid positioning of the latter.

Referring to the drawings in detail and in particular to FIGURES 1 to 6, 10 indicates, generally, an infeed conveyor presenting guide tracks 11 in which operate divided conveyor belts 12 flanking, in each track, a propelling elevator 13 which lifts and feeds a group of crackers 14 forwardly at higher speed than the travel of the belts 12. This mechanism does not form a specific part of the present invention and is fully disclosed in an application of common assignor Arthur J. Griner, Serial No. 334,796, filed December 31, 1963, for Method and Apparatus for Handling Tablet-Like Articles. The use of the mechanism herein provides a feeding apparatus for columns of crackers 14 which are fed successively in series designated S1, S2, S3, S4 and S5 of which it is desired to assemble a continuous non-broken line 16 on an outfeed conveyor 17, to be later referred to, preparatory to feeding a wrapping machine. Heretofore, a space separated each columnar length of crackers S1, S2, S3, S4 and S5, which had to be filled manually by the insertion of a short length of stacked crackers. With the novel method and apparatus disclosed herein the crackers are discharged in a continuously advancing, unbroken column 16 preparatory to metering and wrapping.

The cracker columns S1, S2, S3, S4 and S5 are fed onto a funneling conveyor 18 in successive order and as seen in FIGURES 3 to 6 are directed by converging side tapes or belts 19 and 20, operating along guide strips or walls 19a, 20a, to a throat 21 formed by opposing pulleys 22 and 23 for operating the side belts 19 and 20, respectively. The cracker columns S1, S2, S3, S4 and S5 arrive from the infeed conveyor 10 one after the other and in longitudinally non-aligned spaced relation and the converging arrangement of the side belts will cause the columns S1, S2, S3 and S4 to be diverted from their straight travel as they come out of the infeed conveyor. The component action of the funneling conveyor 18 and the side belts or tapes 19 and 20 cause all but the center stack S5 to be propelled obliquely to the direction of travel of conveyor belt 18. It will be understood that the crackers of each of the columns are not compactly stacked as they are propelled onto the belt 18 at relatively high speed. The side belts 19, 20 operating in an oblique direction with respect to the linear travel of the belt 18 provide an aligning action along the side of each column of crackers. The center column S5 has a straight path of travel and the crackers thereof are aligned at the throat 21. As the columns S1, S2, S3 and S4 engage the side belts, the crackers of each series assume the oblique direction of travel. As this occurs, the tail end of a column, that has contacted one of the side belts 19 or 20, is engaged by a depending pusher 24 (FIGURES 13, 14 and 15) whose shank, is pivoted as at 25 to the link 26 of a chain pusher conveyor 27, and is connected at its upper end to the chain of the conveyor 27 by a link 28 which acts to sweep the pusher quickly in an arc as the chain passes about spaced sprockets 29. The lower reach of the chain passes through a track 30 positioned above and adjacent the upper edge of each of the side belts 19 and 20, so that one or more brushes 31, as will be later described, can push the columns of crackers along with the belt 18 and at the same time maintain the rearmost crackers of each advancing column from falling backward. The side belts 19 and 20 may be omitted, if desired.

The funneling conveyor 18 is provided with two oppositely disposed chain pusher conveyors 27, and one pusher 24 of each chain carries two brushes 31 while the other pusher carries one brush 31. It will be seen that the brush conveyor 27 at one side of the conveyor 18 engages alternately with the tail ends of the cracker columns S1 and S2 and the single brush 31 (FIGURE 4) engages the tail end of S2 at a point spaced from the side belt 20. While a double brush 31 can be used to propel S1 because it comes off the infeed 10 almost contiguously with the respective side belt 20, the use of a double brush on S2, whose tail end is spaced from the belt 20, might interfere with the lateral swing of the tail end of S2 as it edges laterally toward the belt 20. The rate of travel of cracker columns is relatively rapid and the timing of the chain drives 63, 64, and 65 is accordingly closely coordinated with the operation of the funneling conveyor 18 and the side belts 19 and 20.

The drive means comprises a main shaft 32 deriving its power from a motor M through a belt or chain drive 33 to operate the infeed conveyor belts 12 through the sprocket and chain unit 34 of a gear ratio unit 36 (FIGURE 1). One set of chain gears 29 is mounted on brackets 37 supported on the frame 38 of the machine, while the other set of chain gears 29 are mounted on brackets 39 which include vertically disposed stanchions or housings 40 (FIGURE 9) for holding various countershafts 41 for transferring drive power from a sprocket 42 to the chain sprockets 43 and thence through chain drives 44 to the pusher conveyor chains 27. As seen in FIGURES 1, 2 and 9 the conveyor 18 terminates just beyond the pulleys or rollers 22 and 23, and adjacent to the end of a shuttle belt assembly comprising a belt 46 overlying a shuttle plate 47 and passing about suitable rollers 48a to be driven through a gear train 48 deriving its power from a sprocket driven shaft 49 whose sprocket 50 is driven by a chain 51. The latter is driven from a cam shaft 52 deriving its power through a gear ratio unit 53 from drive shaft 32. The shaft 49 through a sprocket and chain combination 54 drives the outfeed conveyor belt 17 which passes over rollers 17a and overrides a plate 56 that extends backwardly under the overhanging end 57 of the shuttle belt 46. The structure of the shuttle belt will be explained in detail later. The drive combination 54 also operates a chain drive 58 to operate a countershaft 59, FIGURE 11, which mounts an end sprocket 60 of a discharge pusher unit 61 for carrying column pushing brush members 62, spaced about a sprocket chain 63 passing about the sprockets 60, 64 and 65. The brush members 62 are similar in construction to the pushers 24 previously described except that each member carries two brush ends 68 for propelling the columns along the shuttle belt 46, there being three members 62 and a track 66 along which the chain travels at such a height as to permit the brushes 68 to sweep along the belt 46. The track 66 is supported by brackets 67 from the frame 38.

The columns S1 to S5 are discharged from the infeed conveyor in spaced relation and columns S1 to S4 are first propelled by the brushes 31 of the chain pusher conveyors 27 along with the side tapes or belts 19 and 20 to converge at the throat 21 between the rolls 22 and 23 about which the tapes pass. The speed of the belts 12, 18, 46 and 17 is controlled through the gear ratio units 36 and 53. The speed of the discharge belts 12 is slower than the projecting motion of the propelling elevators 13 which closely coincide with the speed of the conveyor belt 18 and the side belts 19 and 20 whereby the columns of crackers are brought to the throat 21 as rapidly as consistent with the discharge speed thereof and moved onto the shuttle belt 46 which has a forward cracker feeding speed comparable to the speed of the discharge or outfeed belt 17 and a bodily retract speed of substantially half the cracker feeding speed. The apparatus is designed to feed the preceding column of crackers (see FIGURES 3A, 4A, 5A and 6) at such an advancing speed with belt 17 that when the shuttle belt 46 begins a bodily retract movement, as will be presently explained, the cracker-feeding forward speed of the belt 46 will start to deposit the crackers of the second column immediately in the space at the end of belt 46 being left by the combined retract action of belt 46 and the feed movement of belt 17. In FIGURE 3A, belt 46 has been shuttled or extended to its limit forward position and during its retract movement, as in FIGURE 4A, the feed movement of the belt 46 combined with this retract movement is letting the crackers of the second or following column S1 drop into the space remaining at the end of the stack S5 as the latter is moving away. The stack S1 becomes a part of stack S5 there being no space left between them and the crackers on belt 17 form a continuous unbroken column from which they are led to a wrapping machine.

In order to carry out this method of forming a continuous column of crackers use is made of a shuttle conveyor frame 70 which includes (FIGURES 7, 8 and 9) feed rolls 48a over which passes a reversely looped reach 71 of belt 46, and side plates 72 having ears 73 for mounting the frame 70 for reciprocating movement on side bars 74 supported in brackets 75 on the machine frame 38. Some of the feed rolls are journalled in suitable brackets mounted on the side walls of the frame 38, while the rollers 48a that delineate the looped reach 71 of belt 46 are journalled in the side plates 72. The shuttle plate 47, at its opposite edges, is supported as at 76 by studs or other mounting means from the sides of the frame 70 and acts as a support plate over which the belt 46 rides, the plate 47 the loop reach 71 of the belt and the frame 70 all being arranged to reciprocate in unison. The reach 71 of the belt 46, at its forward end, provides a reciprocatory action indicated in outline in FIGURE 7, when the frame slides back and forth by a rock arm 77 connected to the frame 70 by a bracket 78 and an adjustable connector 79. The rock arm 77 is mounted on a cross-shaft 80, journalled in the sides of frame 38, which shaft in turn carries a cam-arm 81, and a roller 82 which rides in the cam slot 83 in the face of a plate cam 84. As the rollers 48a journalled in the frame 72 reciprocate between a retract position as shown in full lines in FIGURE 8 and an advance position as shown in outline, the belt 46, or rather that portion thereof forming the loop reach 71, will reciprocate as well as continue its cracker feeding travel and while in motion will be supported by the shuttle plate 47. This structure is referred to as the shuttle means and during each retract movement thereof the feed of the belt 46 will quickly deposit crackers in the space left by the advance of the preceding column on the belt 17. As the belt loop 71 retracts there will tend to be a slack in the belt which is taken up by free counterweights 85 pivotally suspended from arms 86 secured on a cross shaft 87 on which are supported spaced arms 88 carrying a roller 89 about which the belt 46 passes. Springs may be employed, if desired, instead of the counterweights, whose operation is automatic. As the frame 70 is advancing in movement the tension in belt 46 will be relieved by the rising action of the counterweights 85 which will allow the belt to yield in its advance movement and without affecting the speed of travel of the belt. Belt 17 is held taut by a tension arm and roller device 90 which may be set as at 91 to take up slack in belt 17. The belt 46 must be maintained taut at all times in order not to disturb the crackers being carried thereon. One or more cover plates 92 may be employed to provide depending guide channels for defining the paths of the crackers along the conveyors. Guide plates 93 forming a guide channel on the shuttle frame and belt may also be provided. In FIGURES 6, 8 and 9, a guard bar 94, extending between the side plates 72 of frame 70 and directly beneath the nose end of the shuttle engages the rear cracker of the discharged column to prevent it from falling over. It will be seen in FIGURE 6 that the first cracker coming off belt 46 will strike the last cracker on belt 17, near the top thereof, with the result that all of the following crackers on belt 46 will be deposited vertically on belt 17 as the shuttle begins and continues its retract movement. On the forward or advance stroke of the shuttle the latter travels approximately the speed of the belt 17 so that the shuttle keeps up with the discharge rate of travel. Meanwhile the higher shuttle belt feed drives the next stack or series to the dropping point as the shuttle starts its retract movement (over dead center on the cam 84). The combined retract motion of the shuttle and the forward speed of the belt thereof will drop the entire cracker column onto the belt 17 during substantially two-thirds of a cycle and will stack the crackers closely on the discharge belt at a lesser angle of obliquity.

The reciprocatory motion of the loop reach 71 of the shuttle conveyor belt feeds a column of crackers to a point coinciding with the last cracker of the column that has been previously deposited on belt 17, and as soon as the retract action of the loop reach 71 begins, the combination of retract speed and forward cracker feed of the belt 46 will cause a "step-off" action of the crackers to completely fill up the space following the preceding stack as it is advanced by the feed of the outfeed belt 17. As a consequence, no manual feeding of filler crackers is necessary. Also the combined retract and belt feed speeds will cause the crackers to drop off more rapidly than if the retract movement was not used and, while the crackers have an advancing speed equal to the feed of the belt, the reverse movement or retract of the belt reach 71 deposits rather than feeds the crackers to belt 17, thus eliminating breakage and providing a gentle edgewise stacking operation.

The invention is not to be restricted to the precise details of construction shown since various changes and modifications may be made therein without departing from the scope of the invention or sacrificing the advantages to be derived from its use.

What is claimed is:

1. In an apparatus for feeding a continuous column of crackers stacked edgewise, to a packaging machine, infeed and outfeed conveyors, tie-in conveyor means for connecting said infeed and outfeed conveyors including a funneling conveyor for receiving laterally disposed longitudinally aligned columns of crackers from said infeed conveyor, means for converging the travel of said stacks on said funneling conveyor toward a funneling discharge position, including cracker column feeding means arranged in converging relation at opposite sides and on top of said funneling conveyor, means for providing a component feeding action to said columns to align the crackers thereof as they are fed along said funneling conveyor, a shuttle conveyor for receiving said cracker columns one at a time from said funneling conveyor, said outfeed conveyor being adapted to receive said columns from said shuttle conveyor and means for shuttling said conveyor with respect to the outfeed conveyor to deposit said columns on the latter in a single continuous column of stacked crackers.

2. In an apparatus according to claim 1 including column pushing finger means and side guides constituting said column feeding means coacting with the movement of said funneling conveyor.

3. A device of the character set forth in claim 2 in which said side guides include tape or belt means moving with said pushing finger means to feed said columns of crackers with the feeding movement of said funneling conveyor.

4. Tie-in conveyor means for connecting infeed and outfeed conveyors including a funneling belt conveyor for receiving spaced columns of crackers from the the infeed conveyor, converging guide means forming a throat section coacting with the funneling conveyor to align the crackers of the columns as they advance to said throat section, a shuttle belt conveyor for receiving the stacks from the funneling conveyor, said shuttle conveyor including a frame about which the shuttle belt passes to form a reversed loop reach section having a discharge end overlying the outfeed conveyor, means for reciprocating the shuttle frame to cause said loop reach portion to effect an advance movement at one speed while the belt is operating to feed the creackers to the discharge end of the loop reach section and a retract movement at another speed to deposit the crackers on the outfeed conveyor during said retract movement, and in endwise contiguous relation with crackers previously fed to said outfeed conveyor.

5. Tie-in conveyor means as set forth in claim 4 in which said shuttle frame reciprocating means includes a cam, support bars for said frame and cam operated means for moving the frame along said bars, means for operating said shuttle belt about the frame while the latter is reciprocating, means for maintaining said belt taut during reciprocation of the frame and a guard bar at the front of said frame for engaging the end cracker of a column previously fed to the outfeed belt, when the frame is reciprocating in a feeding direction.

6. Tie-in conveyor means as set forth in claim 4 including chain driven pusher means associated with said guide means for holding the crackers in closely stacked relation as they are aligned and fed to said throat section, chain driven pusher means on said shuttle conveyor for supporting said stacks as they advance with said conveyor, tracks for each of said pusher means, and a guard means at the leading edge of said shuttle frame for engaging the last of the previously fed crackers on said outfeed conveyor when the shuttle frame has an advance movement.

7. Tie-in conveyor means for connecting infeed and outfeed conveyors including a funneling conveyor receiving spaced columns of crackers from an infeed conveyor, a shuttle belt conveyor including a frame and the belt travelling about said frame for receiving the columns of crackers from the funneling conveyor and feeding them to an outfeed conveyor, means for operating the shuttle belt at one speed, means for reciprocating said frame in an advance stroke at a different speed and in a retract stroke at another speed, the speeds of the shuttle belt and frame coacting to feed the crackers to the outfeed conveyor in step-off action and on a retract stroke of the frame for depositing continuous series of columns of crackers in endwise contiguous relation on said outfeed conveyor.

8. In an apparatus for conveying crackers discharging from an infeed conveyor, in combination, funneling conveyor means for receiving laterally disposed longitudinally spaced columns of crackers from said infeed conveyor, converging side means on said funneling conveyor for guiding said stacks to a point of discharge restricted to passage of single columns, shuttle belt means for receiving said columns from the funneling conveyor columns, outfeed conveyor means for receiving said stacks from said shuttle conveyor, means for reciprocating a section of said shuttle conveyor with respect to said outfeed conveyor to deposit the columns of crackers in endwise contiguous relation on said outfeed conveyor and said converging side means including guide strips along which the crackers are aligned by the component action of the funneling belt, and pusher means for advancing the stacks along said guide strips.

9. Tie-in conveyor means for connecting infeed and outfeed conveyors including a funneling conveyor for feeding a column of stacked crackers, a shuttle conveyor for receiving crackers from the funneling conveyor and passing them to the outfeed conveyor, said shuttle conveyor comprising a frame, means for mounting the frame for reciprocating movement, means for reciprocating said frame, a feed belt passing about said frame to form a loop reach extending at its discharge end over said outfeed conveyor for dropping belt-fed crackers on said outfeed conveyor during a retract movement of said frame, means for maintaining said feed belt in taut condition during reciprocating movements of said frame, and cam means in said reciprocating means for reciprocating the frame at different advance and retract speeds whereby a combination of forward feed-belt speed and retract movement of the loop-reach end thereof causes the crackers to step off the belt at the discharge end.

10. Tie-in conveyor means for connecting infeed and outfeed conveyors including a funneling conveyor for feeding a column of stacked crackers, a shuttle conveyor for receiving crackers from the funneling conveyor and passing them to the outfeed conveyor, said shuttle conveyor comprising a frame, means for mounting the frame for reciprocating movement, means for reciprocating said frame, a feed belt passing about said frame to form a loop reach extending at its discharge end over said outfeed conveyor for dropping belt fed crackers on said outfeed conveyor during a retract movement of said frame, means for maintaining said feed belt in taut condition during reciprocating movements of said frame and guard means across the frame and beneath the discharge end of said loop reach to engage the preceding column of crackers that have been fed to said outfeed conveyor when the frame has an advance movement.

References Cited by the Examiner

UNITED STATES PATENTS

| 1,843,282 | 2/1932 | Horn | 198—60 X |
| 1,990,549 | 2/1935 | Kimball | 198—32 |
| 3,106,280 | 10/1963 | Baker. | |

FOREIGN PATENTS 891,527  9/1953  Germany.

EVON C. BLUNK, *Primary Examiner.*

RICHARD E. AEGERTER, *Examiner.*